United States Patent
Ahn et al.

[11] Patent Number: 5,898,716
[45] Date of Patent: Apr. 27, 1999

[54] STRUCTURE OF A PASSIVELY MODE-LOCKED OPTICAL FIBER LASER

[75] Inventors: Joon Tae Ahn; Hack Kyu Lee; Kyong Hon Kim, all of Daejon, Rep. of Korea

[73] Assignee: Electronics and Telecommunications Research Institute, Daejon, Rep. of Korea

[21] Appl. No.: 08/934,810

[22] Filed: Sep. 22, 1997

[30] Foreign Application Priority Data

Sep. 23, 1996 [KR] Rep. of Korea ............. 69-41617

[51] Int. Cl.[6] ...................................... H01S 3/30
[52] U.S. Cl. ................... 372/6; 372/18; 372/94
[58] Field of Search ................. 372/6, 11, 18, 372/21, 94, 703, 700

[56] References Cited

U.S. PATENT DOCUMENTS 5,359,612 10/1994 Dennis et al. .................. 372/18
5,450,427 9/1995 Fermann et al. ................ 372/18

OTHER PUBLICATIONS

E. Yoshida, et al., "Laser diode–pumped femtosecond erbium–doped fiber laser with a sub–ring cavity for repetition rate contgrol", Appl. Phys. Lett 60(3), 1992 American Institute of Physics, pp. 932–934, No month.

Primary Examiner—Rodney Bovernick
Assistant Examiner—Robert E. Wise
Attorney, Agent, or Firm—Jacobson, Price, Holman & Stern, PLLC

[57] ABSTRACT

A laser structure for obtaining an optical pulse of a very short duration by using the benefit of a passive mode locking and for improving a repetition rate of an output optical pulse was described. In general, a passively mode-locked laser generates a short optical pulse than a active mode locked laser does, while it has difficulties in increasing the repetition rate of the output optical pulse because the repetition rate of the passively mode-locked laser is determined by the length of the resonator. In accordance with the present invention, a delayed optical path is added to the linear loop of a conventional figure-8 optical fiber laser. The propagation time difference $\Delta T$ between the delayed optical path and undelayed short optical path is adjusted to a divisor of the round trip time, T, of the original resonator by properly adjusting the length of the delayed optical path. Thus, the repetition rate of the output optical pulse of the mode locked laser can be increased from $1/T$ Hz to $1/\Delta T$ Hz. The optical fiber laser which can fully exploit the advantages of the passive mode locking and improve the repetition rate of the output optical pulse in accordance with the present invention can be applied to a wide range of applications including an optical communication and an ultra high speed analysis of optical phenomena.

3 Claims, 4 Drawing Sheets

STRUCTURE OF A PASSIVELY MODE-LOCKED OPTICAL FIBER LASER

BACKGROUND OF THE INVENTION

1. Field of the Invention

The present invention relates to a structure of a passively mode-locked optical fiber laser, and more particularly, to a structure of a laser for increasing the repetition rate of passively mode-locked pulses.

2. Description of the Related Art

In general, an optical fiber laser uses a rare-earth-doped fiber as a gain medium. Since the rare-earth-doped fiber has a very wide gain bandwidth, the optical fiber laser is suitable for obtaining a very short optical pulse of which duration is below $10^{-12}$ second.

On the other hand, a mode locking technique is used to produce a high peak power an optical pulse, and is classified into active and passive mode lockings. The active mode locking technique uses the periodic loss of a resonator induced by a modulator, and the repetition rate of mode-locked pulse can be easily varied by adjusting the frequency of a signal supplied to a modulator. The time duration of an actively mode-locked pulse is usually longer than that of a passively mode-locked pulse.

The passive mode locking technique utilizes a saturable absorber of which transmission rate varies according to the intensity of input light, and can usually produce an optical pulse of which time duration is shorter than that by the active mode locking technique. However, the passive mode locking technique has a problem that the repetition rate of the output optical pulses is usually fixed to a cavity round trip frequency.

The conventional passive mode locking of an optical fiber laser thus described utilizes an intensity-dependent nonlinear effect of an optical fiber, and has been studied through two kinds of laser structure, one is a figure-8 laser which uses a nonlinear amplifying loop mirror (NALM), and the other is a ring laser which uses nonlinear polarization rotation.

SUMMARY OF THE INVENTION

It is therefore an object of the invention to provide a passively mode-locked optical fiber laser scheme with a delayed optical path (DOP) in order to increase the repetition rate of output pulses.

In accordance with one aspect of the present invention, a passively mode-locked optical fiber laser for increasing a repetition rate of output optical pulses thereof is provided which comprises a nonlinear amplifying loop mirror serving as a saturable absorber for a passive mode locking and including a polarization controller for adjusting a birefringence of a resonator and varying a transmission rate thereof, an erbium-doped fiber for a gain medium of the laser, a wavelength division multiplexer for coupling an output of a laser diode for optically pumping said erbium-doped fiber to the laser resonator, a directional coupler for splitting a signal which is input or output, and a nonlinear optical fiber for obtaining a nonlinear phase difference sufficient to cause a passive mode locking between two lights which are split from said directional coupler and propagate to the clockwise and counterclockwise directions, respectively; and a linear loop including an optical isolator which blocks a light reflected by said nonlinear amplifying loop mirror and allows a light transmitted from said nonlinear amplifying loop mirror to pass therethrough, a directional coupler for splitting the transmitted signal, a delay line for receiving one of output signals from said directional coupler and for adjusting the length of a delayed optical path to improve a repetition rate of an optical pulse, a polarization controller for adjusting a polarization of the light incident through said delay line a undelayed short optical path for receiving the other output signals from said directional coupler, a directional coupler for combining the two signals from said delayed optical path and undelayed short optical path, respectively, and also used for splitting mode-locked laser output, an erbium-doped optical fiber for supplying a gain required in accordance with the increase of the repetition rate, a wavelength division multiplexer for coupling an output of a laser diode for optically pumping said erbium-doped fiber to the laser resonator, a laser diode for optically pumping said erbium-doped optical fiber, and a polarization controller for causing an oscillation of the laser by adjusting the polarization of the light propagating through the linear loop.

In accordance with the present invention, a delayed optical path is added to a linear loop of a figure-8 laser. Thus, the repetition rate of the output optical pulse can be improved by adjusting the optical path length difference between the delayed optical path and the undelayed optical path.

BRIEF DESCRIPTION OF THE DRAWINGS

The present invention will become more apparent upon a detailed description of the preferred embodiments for carrying out the invention as rendered below. In the description to follow, references will be made to the accompanying drawings, where like reference numerals are used to identify like or similar elements in the various drawings and in which.

DETAILED DESCRIPTION OF THE INVENTION

Figure 1:
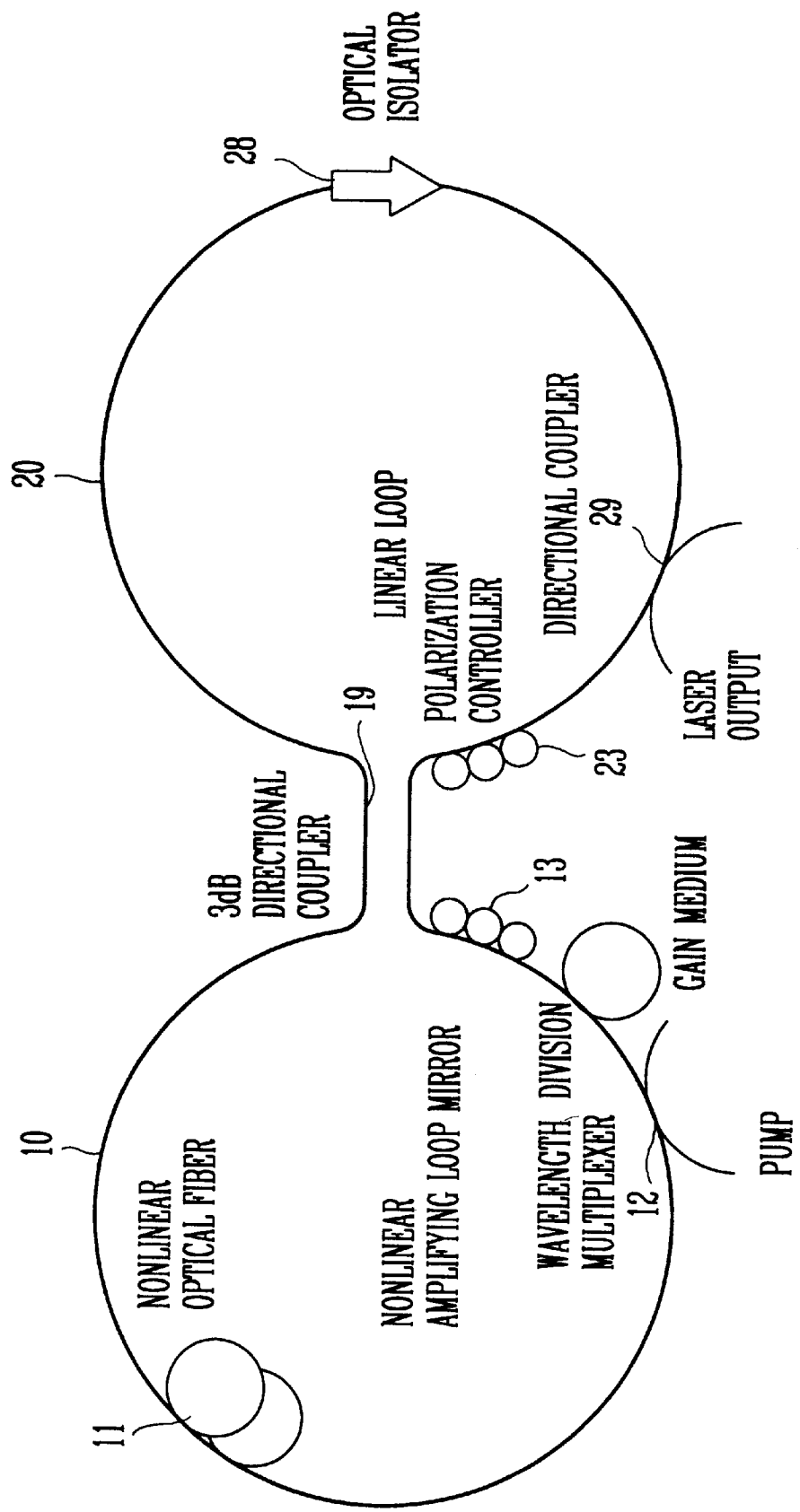
FIG. 1 is a view illustrating a structure of a conventional passively mode-locked optical fiber laser using a figure-8 resonator.

Referring now to FIG. 1, there is shown a view illustrating a structure of a conventional passively mode-locked optical fiber laser using a figure-8 resonator. In this optical fiber laser, a nonlinear amplifying loop mirror (NALM) 10 including a gain medium, a wavelength division multiplexer (WDM) 12 of which coupling efficiency varies according to the wavelength, an optical fiber 11 for obtaining a nonlinear effect, etc. serves as a saturable absorber required for passive mode locking.

Two terminals of the nonlinear amplifying loop mirror 10 are connected through an optical isolator 28 to form a linear loop (LL) 20. The linear loop 20 includes a directional coupler (DC) 29 for providing the laser output. Thus, a laser mode locking can be achieved by properly adjusting a polarization controller (PC) 13, 23 included in the nonlinear amplifying loop mirror 10 and the linear loop 20.

The round trip time T of the resonator is the time required for the light to travel round the nonlinear amplifying loop mirror 10 and linear loop 20. Since the repetition rate of the optical pulse from a passively mode-locked laser is determined as 1/T, the repetition rate of the output optical pulse decreases as the round trip time increases.

The passive mode locking of an optical fiber laser is viable only if a sufficient amount of nonlinear effects can be obtained. As a result, the resonator has very long length of fibers from several ten meters to several hundred meters. A passively mode-locked optical fiber laser produces a very short optical pulse; however it has a drawback that the repetition rate is low because of the long resonator length.

Figure 2:
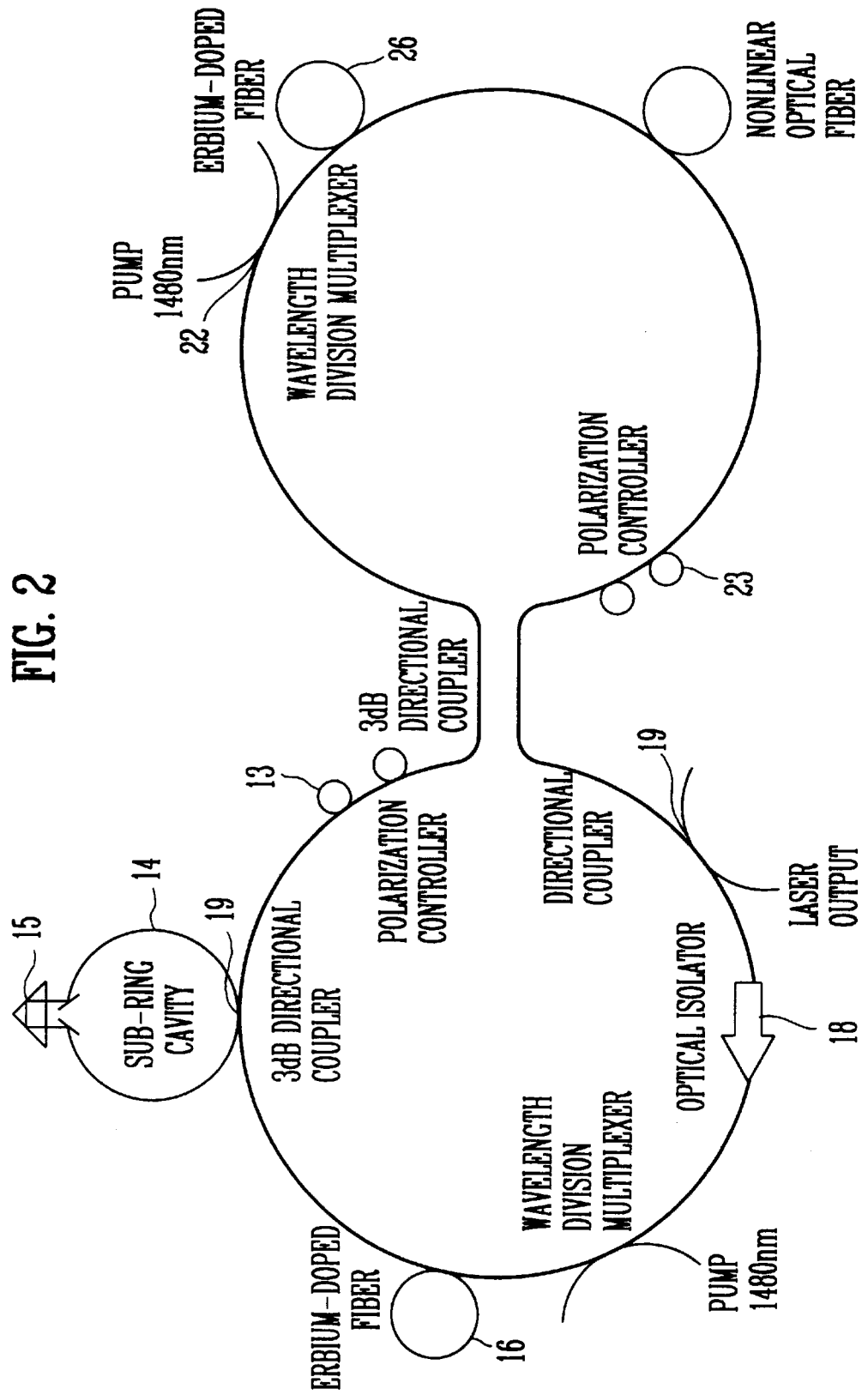
FIG. 2 is a view illustrating a structure of a conventional laser where a repetition rate has been improved by the use of a sub-ring cavity.

FIG. 2 is a view illustrating a structure of a conventional laser where a repetition rate has been improved by the use of a sub-ring cavity. The laser has been formed by attaching a sub-ring cavity 14 to the linear loop 20 of the figure-8 laser shown in FIG. 1 in order to improve the repetition rate. In this laser, the time seperation of each output optical pulse is the round trip time of the sub-ring which is shorter than the round trip time of the laser resonator. However, a delay line 15 which can adjust the length of the optical path is required in the sub-ring. The delay line 15 should have a reasonable length. Thus, this laser structure has a structural limitation in improving the repetition rate.

Figure 3:
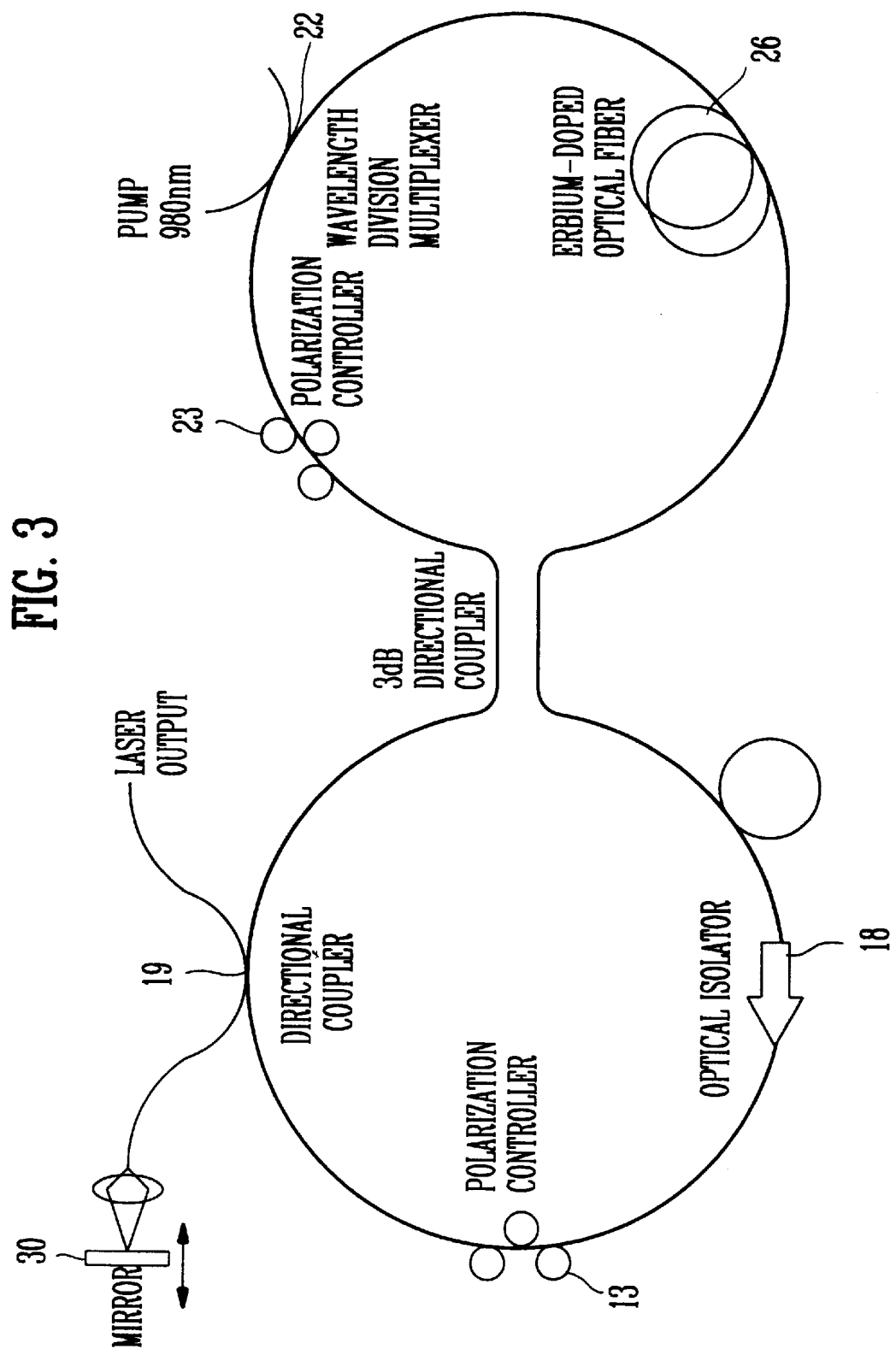
FIG. 3 is a view illustrating a structure of a conventional laser where a repetition rate has been improved by using an extracavity feedback.

FIG. 3 is a view illustrating a structure of a conventional laser where a repetition rate has been improved by using an extra feedback. This laser uses an extra cavity feedback method, wherein the light is reflected by the mirror (HR) 30 back to the inside of the resonator at the terminal in the opposite side to the optical fiber coupler for obtaining a laser output, to improve the repetition rate. The structure of this conventional laser is different from that of the laser in accordance with the present invention in that the conventional laser uses the light reflected by the nonlinear amplifying loop mirror 10.

Figure 4:
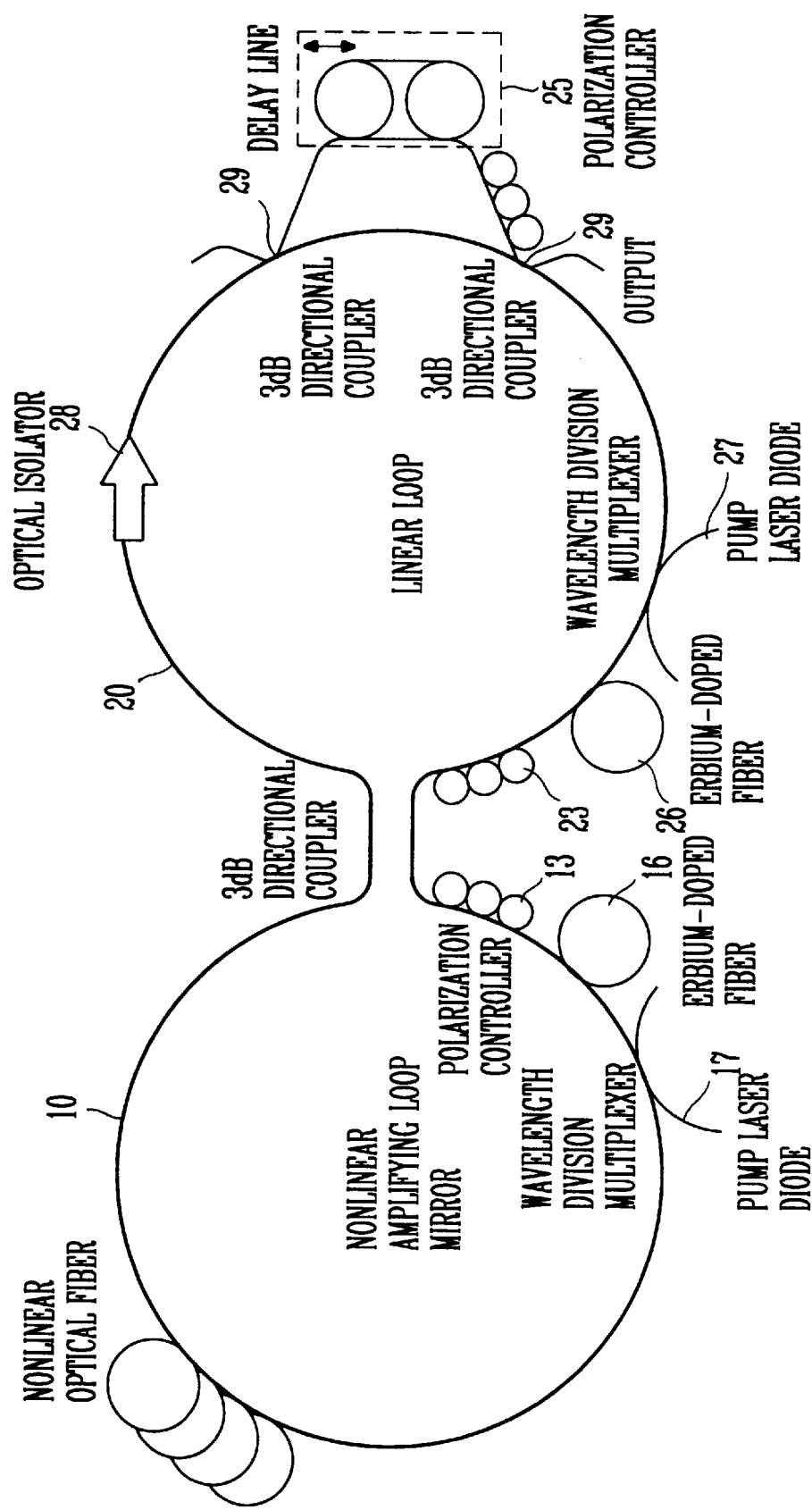
FIG. 4 is a view illustrating a structure of an optical fiber laser having a delayed optical path in accordance with the present invention.

FIG. 4 is a view illustrating a structure of an optical fiber laser having a delayed optical path in accordance with the present invention. The optical fiber laser in accordance with the present invention comprises a nonlinear amplifying loop mirror (NALM) 10 and a linear loop 20.

The nonlinear amplifying loop mirror 10 comprises a polarization controller 23 for adjusting the birefringence of a resonator, an erbium-doped fiber 26 containing a gain medium of the laser, and a wavelength division multiplexer (WDM) 22 for coupling the output of an optical pumping laser diode for optically pumping the erbium-doped fiber to the laser resonator. The nonlinear amplifying loop mirror 10 further comprises a nonlinear optical fiber. The nonlinear optical fiber is to obtain a nonlinear phase difference sufficient to cause a passive mode locking between two lights which originate from a 3 dB directional coupler (DC) 29 and propagate to the clockwise and counterclockwise directions, respectively through the nonlinear amplifying loop mirror 10. The nonlinear optical fiber serves as a saturable absorber necessary for a passive mode locking.

The linear loop 20 comprises an optical isolator 25 which blocks the light reflected by the nonlinear amplifying loop mirror 10 and allows the transmitted light to pass therethrough, and a set of optical amplifiers for supplying a gain required to accommodate the increase of the repetition rate by using the erbium-doped fiber 26, the wavelength division multiplexer 22, and a pump laser diode 27. The linear loop 20 further comprises a polarization controller 23 for adjusting the polarization of the light incident upon the nonlinear amplifying loop mirror 10, a delay line 25 for exactly adjusting the length of the delayed optical path to meet the condition under which a repetition rate can be improved, and a polarization controller (PC3) 23 for causing an oscillation of the laser by adjusting the polarization of the light propagating through the delayed optical path.

Thus, if the time difference ΔT delayed by the delayed optical path 40 is made equal to a divisor of the round trip time T of the resonator by properly adjusting the length of the delayed optical path 40, the repetition rate of the optical pulse output from the laser can be improved from 1/T Hz to 1/ΔT Hz.

In accordance with the structure of the optical fiber laser, the amount of improvement in a repetition rate is determined not by the absolute length of the delayed optical path 40 but by the time difference ΔT between the delayed optical path and the undelayed short optical path. Thus, the characteristic feature of the optical fiber laser in accordance with the present invention resides in that the improvement of the repetition rate is not limited by the length of the delay line 25 necessarily required to adjust the length.

The structure of the figure-8 optical fiber laser has been explained by way of example in the description of the method of using the delayed optical path 40. However, even if the method of using the delayed optical path 40 is applied to a ring resonator laser, or a Fabry-Perot type resonator laser, the improvement of the repetition rate of the output optical pulse can be obtained by the same principle.

The structure of the passively mode-locked optical fiber laser as described thus far has not only the advantage of short pulse duration but also the characteristics of the increased repetition rate. Thus, the optical fiber laser in accordance with the present invention can be applied to a wide range of applications including an optical communication and an ultra high speed analysis of optical phenomena.

The present invention has been described with reference to a particular embodiment in connection with a particular application. Those having ordinary skill in the art and access to the teachings of the present invention will recognize additional modifications and applications within the scope thereof. It is therefore intended by the appended claims to cover any and all such applications, modifications, and embodiments within the scope of the present invention.

What is claimed is:

1. A passively mode-locked optical fiber laser for increasing the repetition rate of output optical pulses thereof, comprising:

a nonlinear amplifying loop mirror serving as a saturable absorber for a passive mode locking and including
a polarization controller for adjusting the birefringence of a resonator and varying a transmission rate thereof,
an erbium-doped fiber for the gain medium of the laser,
a wavelength division multiplexer for coupling an output of a laser diode for optically pumping said erbium-doped fiber to the laser resonator,
a directional coupler for splitting a signal which is input or output, and
a nonlinear optical fiber for obtaining a nonlinear phase difference sufficient to cause a passive mode locking between two lights which are split from said directional coupler and propagate in the clockwise and counterclockwise directions around said nonlinear amplifying loop mirror, respectively; and a linear loop including
an optical isolator which blocks a light reflected by said nonlinear amplifying loop mirror and allows a light transmitted from said nonlinear amplifying loop mirror to pass therethrough, a directional coupler for splitting the transmitted signal, a delay line for receiving one of output signals from said directional coupler and for adjusting the length of a delayed optical path to improve a repetition rate of an mode-locked optical laser pulse, a polarization controller for adjusting a polarization of the light incident through said delay line, a undelayed short optical path for receiving the other output signals from said directional couplers, a directional coupler for combining the two signals from said delayed optical path and said indelayed short optical path, respectively, and also used for splitting mode-locked laser output, an erbium-doped optical fiber for supplying a gain required in accordance with the increase of the repetition rate, a wavelength division multiplexer for coupling an output of a laser diode for optically pumping said erbium-doped fiber to the laser resonator, a laser diode for optically pumping said erbium-doped optical fiber, and a polarization controller for causing an oscillation of the laser by adjusting the polarization of the light propagating through the linear loop.

2. The passive mode locking optical fiber laser according to claim 1, wherein said delay line adjusts the optical path length difference between said delayed optical path and said undelayed short optical path.

3. The passively mode-locked optical fiber laser according to claim 2, wherein said delay line adjusts the time difference delayed by the delayed optical path such that it becomes a divisor of the round trip time of the original resonator.

* * * * *